No. 646,110. Patented Mar. 27, 1900.
P. H. F. SPIES.
AMMETER.
(Application filed Aug. 18, 1899.)
(No Model.)
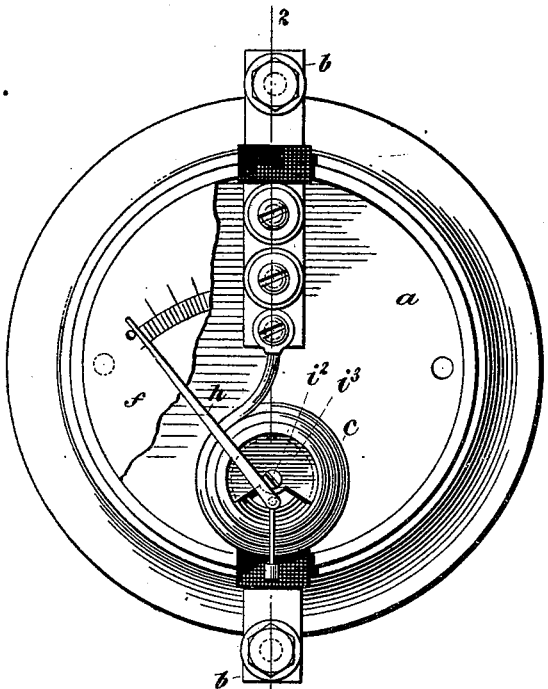
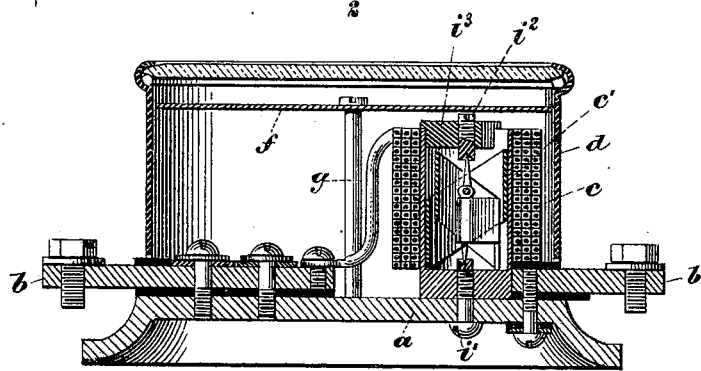
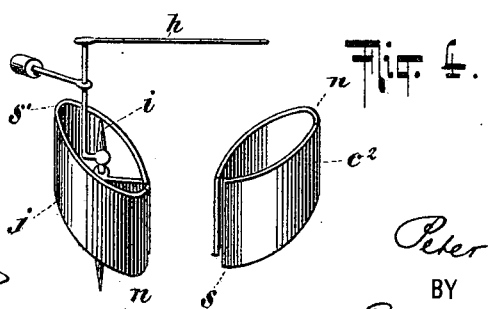
WITNESSES:
INVENTOR
Peter H. F. Spies
BY
ATTORNEYS

UNITED STATES PATENT OFFICE.

PETER H. F. SPIES, OF YONKERS, NEW YORK, ASSIGNOR TO CHARLES G. DURFEE, OF SAME PLACE, AND LOUIS A. RODENSTEIN AND NEIL AMBROSE FLANNERY, OF NEW YORK, N. Y.

AMMETER.

SPECIFICATION forming part of Letters Patent No. 646,110, dated March 27, 1900.

Application filed August 18, 1899. Serial No. 727,616. (No model.)

*To all whom it may concern:*

Be it known that I, PETER H. F. SPIES, a subject of the Emperor of Germany, residing at Yonkers, Westchester county, State of New York, have invented a new and useful Ammeter, of which the following is a specification.

My invention relates to electrical measuring instruments, more especially to ammeters, although the invention likewise includes voltmeters, as to convert the instrument from an ammeter into a voltmeter it is only necessary to change the size of the winding and the number of turns. It is therefore to be understood that wherever in this specification I use the term "ammeter" I mean to thereby include voltmeter and, *inter alia*, galvanometer, and it is with this understanding that I shall proceed to describe the instrument strictly as an ammeter.

In the accompanying drawings I have shown by way of example a form of ammeter in which my invention is embodied.

In the drawings, Figure 1 is a plan view, partly broken away, of an ammeter embodying my invention. Fig. 2 is a section on line 2 2 of Fig. 1. Fig. 3 is a perspective view of the rotor or movable element of the instrument, and Fig. 4 is a perspective view of the field-piece or stator of the instrument.

In the drawings, $a$ is the base of the instrument, adapted to rest against a wall, which base supports suitable terminals $b$ and a coil $c$. The terminals of the coil are connected to the circuit-terminals $b$.

$d$ is the casing of the instrument, preferably provided with a glass plate. The scale-plate $f$ is suitably supported, preferably by standards $g$, rising from the base. The coil $c$ is wound about a sleeve $c'$, within which is loosely placed a shell or bizet $c^2$, of sheet-iron—that is to say, the sheet-iron is bent up into cylindrical shape and the ends of the cylinder are oppositely beveled, inclined, or stepped, so as to produce the projecting magnetic poles $n$ $s$.

The movable part of the instrument comprises an index-hand $h$, carried upon a pivot $i$, which pivot $i$ carries another shell or bizet $j$, of the same general shape as the bizet $c^2$ and having the polar extensions $n$ $s'$. The movable part carried by the pivot $i$ is intended to be deflected laterally upon the passage of a current, and to this end the pivot $i$ is carried in bearings $i'$, fixed in the base $a$, and $i^2$, carried by plug $i^3$, which slips loosely into the sleeve $c'$ of the coil $c$.

It will be obvious that as the parts $c^2$ and $j$ are the only parts made of iron the ammeter will be exceedingly reliable and accurate. In fact, I have constructed such an ammeter and find it to be extremely delicate, reliable, and accurate.

I am aware that it is not entirely new to base an electrical measuring instrument upon the principle of having fixed and movable magnetized shells, the index-needle being carried by the movable shell. In my case, however, I provide a plurality of shells in which the polarity is localized at given points, being most intense at a particular point and gradually diminishing therefrom. By this means I am enabled to produce an extremely-accurate instrument which can be most conveniently calibrated. It will likewise be observed that the polar edges of the shells taper away from the poles and that the edges of the said shells are inclined with respect to each other, and when I say "inclined" I do not mean necessarily that the edges should be straight or curved, but said edges may be stepped or irregular, within limits, without departing from the spirit of my invention. The idea of the word "inclined" as herein used by me is to convey the impression that the general lines of the said polar edges are inclined with respect to each other.

Having described my invention, what I claim, and desire to secure by Letters Patent, is—

1. In an ammeter, the combination of a current-carrying conductor, an iron part inductively influenced by the said conductor, the said iron part consisting of a shell having sloping ends substantially as described, and a movable iron part embraced by the said shell and beveled ends located in inductive relation to the said other shell and provided with an index for indicating the deflection.

2. In an ammeter, the combination of a current-coil, a sleeve or casing of magnetic material contained therein, having a sloping end or ends forming a free magnetic pole or poles and another body of magnetic material in inductive relation to the said first-named casing and operating a needle or other indicating device, substantially as described.

3. In an ammeter, the combination of a current-carrying coil or conductor and a plurality of shells of magnetic material under inductive influence of the said conductor, one of the shells being movable with respect to the other, the polar edges of the said shells being inclined with respect to each other, substantially as described and for the purposes set forth.

4. In an ammeter, the combination of a current-carrying conductor and a plurality of shells inductively influenced thereby, one of the said shells being movable with respect to the other, each of the said shells having its maximum polarity localized and having polar edges sloping away from the said point of localization, the polar edges of the two shells being inclined with respect to each other, substantially as described and for the purposes set forth.

PETER H. F. SPIES.

Witnesses:
C. G. DURFEE,
HENRY M. TURK.